United States Statutory Invention Registration [19]

[11] Reg. Number: H33

Jameson et al. [45] Published: Mar. 4, 1986

[54] SHAPED-CHARGE

[75] Inventors: Robert L. Jameson, Aberdeen, Md.; Steven Segletes, Pittsburgh, Pa.

[73] Assignee: The United States of America as represented by the Secretary of the Army, Washington, D.C.

[21] Appl. No.: 600,877

[22] Filed: Apr. 16, 1984

[51] Int. Cl.[4] ..... F42B 11/22
[52] U.S. Cl. ..... 102/476
[58] Field of Search ..... 102/475, 476, 306–310

[56] References Cited

U.S. PATENT DOCUMENTS

| | | | |
|---|---|---|---|
| 3,225,694 | 12/1965 | Michelson | 102/476 |
| 3,732,818 | 5/1973 | Thomanek | 102/306 |
| 4,262,596 | 4/1981 | Allier et al. | 102/476 |
| 4,374,495 | 2/1983 | Thomanek | 102/476 |

*Primary Examiner*—Harold Tudor

*Attorney, Agent, or Firm*—Anthony T. Lane; Harold H. Card, Jr.; Edward F. Costigan

[57] ABSTRACT

A shaped-charge for a non-rotating projectile whose structural components, i.e., the conical liner, explosive, and container have asymmetries relative the projectile producing upon explosion controlled deflection of a penetrating jet which is effective on sloped armor surfaces.

10 Claims, 15 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SHAPED-CHARGE

GOVERNMENTAL INTEREST

The invention described herein may be manufactured, used and licensed by or for the Government for governmental purposes without the payment to us of any royalty thereon.

BACKGROUND OF INVENTION

1. Field of the Invention

This invention relates to an improved shaped-charge for a non-rotating projectile.

More particularly, this invention relates to a shaped-charge which, upon detonation, provides controlled deflection of a penetrating jet.

2. Description of the Prior Art

High explosive anti-tank (HEAT) rounds have been in the American arsenal since World War II. The penetration mechanism within the HEAT warhead is the shaped-charge. A shaped-charge consists of a thin-walled metallic cone (the liner) with high explosive molded around the outside of the cone. When the warhead reaches a preset stand-off distance from the target, the explosive is detonated. A shock front passes over the liner causing the liner to progressively deform and collapse upon itself. Under the extreme pressures of the explosion, the solid metallic liner converts to a semi-liquid or amorphous state. When opposing sides of the converging liner meet during collapse, a portion of the metal liner is "squirted" forward with high velocity (approx. 9 km/sec). This material comprising a train of discrete masses at high temperature moving at supersonic velocity is called the jet, and constitutes the penetrating element of the warhead. In the prior art, the flight axis of the jet is generally forward along the axis of symmetry of the warhead. Where guidance, target seeking or sensing components are located in a warhead ogive forward of the shaped charge, the amorphous jet must penetrate such components enroute to the target material which degrades its performance against the target.

The phenomena of shaped-charge or HEAT rounds is particularly important in deflecting enemy combat vehicles such as tanks. Such vehicles are defended primarily by two mechanisms; namely, (a) composition or internal structure of armor plates and sheets mounted on the vehicle, and (b) angle of obliquity presented to incoming anti-tank rounds by such plates or sheets.

Overcoming sloped armor system surfaces in enemy vehicles has been a major challenge to the U.S. Army over the years. Various techniques have been employed previously to accomplish this while more shallow obliquity angles are achieved to deflect incoming warheads. Having the projectile strikes the target while travelling a path of descending arc is one technique which lessens the effects of shallow obliquity of protective armor around the target. Recently, some projectiles have been constructed so that the penetration mechanism is built into the warheads that its penetration force is angularly displaced from the warhead axis of symmetry. Thus upon detonation, the penetrating mechanism of the warhead (a shaped-charge jet) leaves the projectile at a predetermined and built in displacement angle relative to the warhead axis or trajectory.

Each of the previous techniques used to overcome sloped armor defended targets carries with it some drawbacks. Having the projectile strike the target while travelling a descending arcuate path requires that the speed of the projectile be low enough to respond to aerodynamic forces as necessary to cause a continuously changing flight path. Having the projectile travel at low speeds introduces certain additional problems, one of which is that aiming a low speed projectile is considerably more difficult than aiming a high speed projectile. Incorporating the warhead obliquely into the projectile may eliminate the need to fire the projectile at a slow rate of speed. With this construction, the projectile can strike a sloped target surface ineffectively head-on, but the penetrating jet train travels along a path other than the flight axis of the warhead, thus overcoming successfully the target surface obliquity which defeats the projectile as it hits the target. However, this construction produces certain additional problems. Constructing the warhead at an angle in the projectile lessens the allowable size of the warhead for any given projectile diameter. An example of this phenomenon is as follows: if one were to build a shaped charge into the projectile at an angle of ninety degrees (so that the penetrating element would travel perpendicular to the center axis of the projectile), the allowable length of the shaped charge could not exceed the projectile diameter. For built in obliquities or angles between zero (conventional) and ninety degrees (perpendicular), the allowable length of the shaped charge is decreased from a maximum effectiveness length criterion to the projectile diameter, thus comprising its lethality or penetration effectiveness.

SUMMARY OF INVENTION

It is therefore an object of this invention to provide a non-rotating projectile with an improved shaped-charge for use against the sloped armor of a tank.

Another object is to provide an improved shaped-charge with controlled deflection of a penetrating-jet against an oblique surface.

A further object is to provide an improved shaped-charge for use in the conventional produced projectile against sloped armor with greater effectiveness and efficiency of operation.

Other objects and their attendant advantages will become more apparent with the following detailed description when taken with the accompanying drawings, wherein:

This invention is a means of improving the effectiveness of shaped-charge warheads by controlling the angular deflection of an amorphous metal jet relative to the warhead trajectory. The inventive concept in this case is a technique for making a penetrating jet train of amorphous metal travel along a path other than either the flight path or the longitudinal center axis of the warhead. The technique gives the jet train an advantage against oblique (sloped) defensive armor systems such as steel plates or composite sheets by allowing the jet train to enter the target more nearly perpendicular to the armor system surface, thus reducing the line of sight thickness associated with the target. Also, the need to penetrate through a projectile guidance package or detonation sensor in the warhead nose is eliminated by deflecting the shaped-charge penetrator from the projectile axis of symmetry.

The invention at hand is a new technique for having the penetrating element of a shaped-charge warhead overcome the effects of target obliquity. Also, the penetrating element leaves the projectile at an angle from the flight axis of the projectile in order to overcome the target's obliquity. However, the technique employed does not include building the warhead obliquely into the projectile. Instead, the warhead is constructed so as to produce asymmetrical forces on the metallic conical shaped charge so that, upon its conversion to an amorphous jet train, this jet will impact the target armor system in a high speed trajectory displaced from both the projectile trajectory and the projectile center axis. Upon detonation, the shaped-charge liner collapses asymmetrically so as to project its penetrating jet at a predetermined obliquity from the warhead flight axis. The length of the warhead carries with it no constraints regarding the shaped charge diameter as did a previously mentioned technique. The warhead is part of a non-rotating projectile system, so that the improved warhead can retain its proper orientation with respect to its target.

DESCRIPTION OF THE PREFERRED EMBODIMENT

Figure 1:
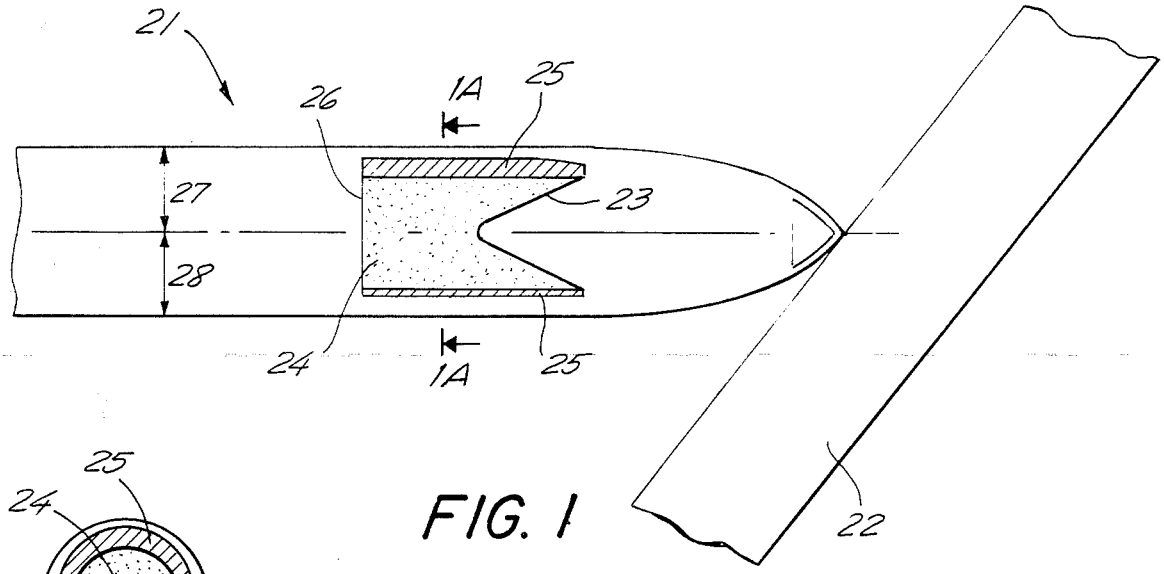
FIG. 1 is a cross-sectional view of a projectile showing the position of the shaped-charge of this invention in relationship to the ogive containing the guidance system.
Figure 1A:
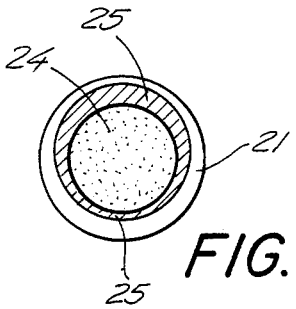
FIG. 1A is a view taken on line 1*a*—1*a* of FIG. 1.

With reference to FIG. 1,

The warhead is represented in free flight in a non-rotating projectile 21 with respect to oblique target 22. The shaped-charge warhead, which is contained within the projectile, consists of a metallic conical liner 23 fitted into an explosive 24 all of which is asymmetrically surrounded by metallic confinement 25 in the radial direction. Upon impact, the explosive 24 is detonated at initiation point 26. As the detonation progresses towards the liner 23, the side of the warhead with the more massive confinement 27 will not be able to explode outward as rapidly in the radial direction as the side with the lesser confinement 28 because of the confinement's inertia. Therefore, a higher pressure will exist in the explosive products on the more heavily confined side 27. This higher pressure will accelerate the confined side of the liner more rapidly than the unconfined side thus causing the heavily confined liner element to acquire a greater velocity than the lesser confined element. The confined side of the liner 27 will correspondingly possess a greater momentum than the unconfined side 28.

Figure 2:
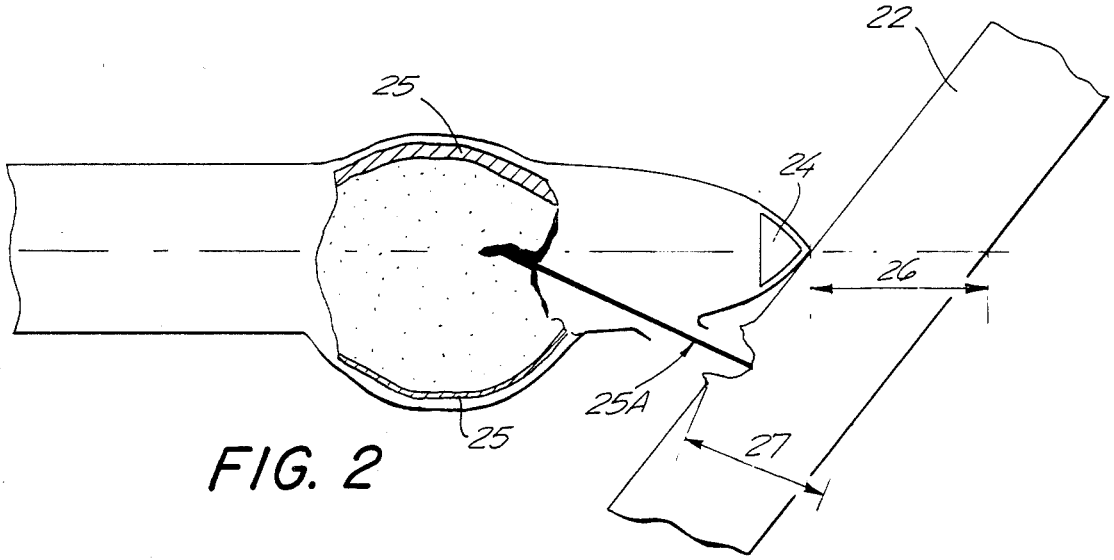
FIG. 2 is a cross-sectional view of the projectile of FIG. 1 showing the effects of detonation of the shaped-charge in relationship to the penetrating-jet on a sloped surface of armor.

Referring to FIG. 2,

This momentum imbalance imparts to the forming jet penetrator 25A a component of momentum transverse to the warhead's axis of symmetry (i.e., a deflection from the axis of symmetry). The penetrator has thus avoided the need to penetrate axial obstructions such as projectile guidance package 24 and has lessened the effective thickness of the oblique target 23 from the line of slight thickness 26 to a smaller distance 27. As such, the inherent advantage of oblique defensive armor plate or sheet surfaces is substantially lessened. The amount of deflection from the projectile axis of symmetry is of a predetermined magnitude which is preferably related to the angle of obliquity of armor systems used on target vehicles against which the HEAT round will be fired.

Figure 13:
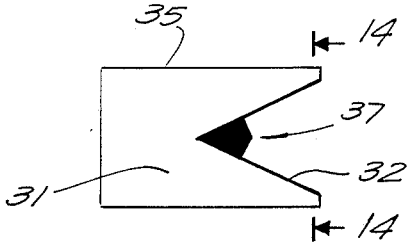
FIGS. 13 and 14 are views showing the improved shaped-charge with a jet-tip inhibitor in position at the apex of the conically shaped liner.
Figure 14:
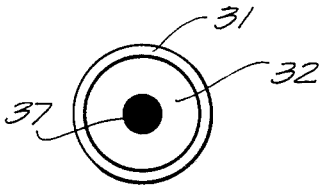
Figure 3:
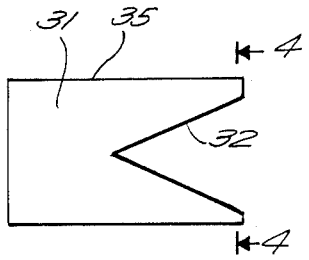
FIGS. 3 and 4 are views showing the improved shaped-charge of this invention with the asymmetry being the thickness of the explosive surrounding the conical liner.
Figure 4:
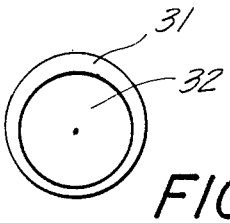
Figure 5:
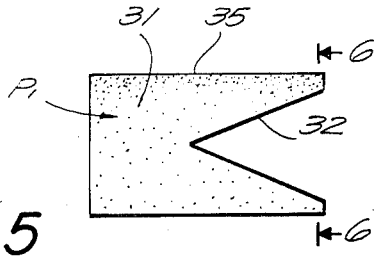
FIGS. 5 and 6 are views showing the improved shaped-charge of this invention with a variation of density in the explosive charge surrounding the conically shaped liner itself.
Figure 6:
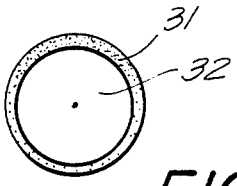
Figure 7:
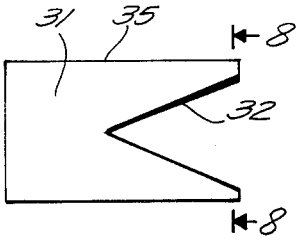
FIGS. 7 and 8 are views showing the improved shaped-charge with a variation of the thickness of the conical liner itself.
Figure 8:
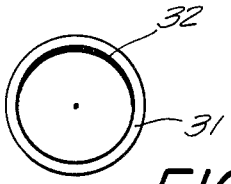
Figure 9:
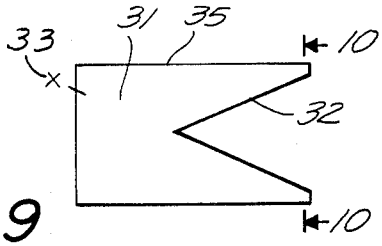
FIGS. 9 and 10 are views showing the improved shaped-charge with an offset point of detonation.
Figure 10:
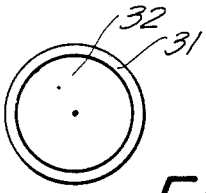
Figure 11:
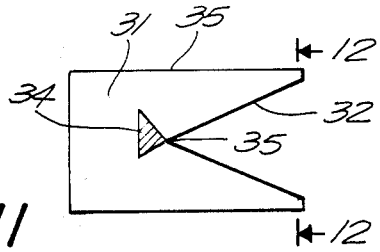
FIGS. 11 and 12 are views showing the improved shaped-charge provided with a wave-shaping device introduced asymmetrically into the warhead.
Figure 12:
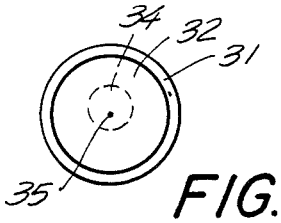

Other asymmetrical techniques which produce a controlled deflection behavior in the shaped-charge jet include placing the explosive 31 in varying thickness around the conical liner as shown in FIGS. 3 and 4. This mode of asymmetry produces highly desirable effects. A further modification is set forth in FIGS. 5 and 6 wherein the explosive is provided around the conical liner in varying controlled density to produce the controller deflection of the penetrator or jet. Referring to FIGS. 7 and 8, another method of control is shown wherein the thickness of the conical liner 32 is varied across a transverse plane relative the axis of symmetry of the warhead. Similarly, the density of the liner 32 may be varied to produce the controlled deflection of the penetrating jet. As shown in FIGS. 9 and 10, the point of detonation or initiation 33 of the warhead explosive is off-axis relative the shaped-charge to produce the aforementioned control. In other words, the initiation is at a point along an axis other than the axis of symmetry of the warhead itself. This type is especially useful when it is desired to use a conventional shaped-charge to direct the penetrating-jet off-axis relative the projectile itself. FIGS. 11 and 12 are views showing a wave-shaping device 34 introduced asymmetrically into the warhead to produce on detonation an asymmetric waveform about the liner. Further, referring to FIGS. 13 and 14, the conical liner is equipped with a jet-tip inhibitor 37 to preclude the apex of the conical liner from collapsing upon warhead detonation.

In all the above modifications, alone or in combination, the penetrating jet avoids axial obstructions in the projectile such as the guidance package and will penetrate an oblique surface of protective armor plate or sheet on a target. However, it is important to note that when used in combination, a cumulative effect is achieved which permits defeat of enemy armor systems having greater obliquity than when any single modification is used alone. This is of special significance because modern tank designs favor extremely low profile to offer less frontal area for incoming anti-tank gunfire aiming and impact. Also, armor systems such as plates and composites are mounted at substantially more shallow angles than were common in World War II. As tank armor systems approach closer to a horizontal reference, they are increasingly more difficult to defeat. By using all of the conceptual modifications shown and described in this case, the penetration jet can be so displaced from the projectile axis as to defeat enemy armor plate at the highest obliquity achievable in modern tank design, whereas use of only one or two such modifications would not necessarily be able to achieve such defeat.

We claim:

1. In a improved anti-tank warhead for an elongated cylindrical non-rotating projectile symmetrical about a center axis:

a shaped-charge comprising a generally conical hollow deformable thin-walled metallic liner, a generally cylindrical mass of explosive co-axially surrounding said liner, and a rigid elongate generally cylindrical wall co-axially surrounding said explosive mass, the improvement comprising:

radial asymmetries selected from the group consisting of in said liner, in said explosive mass and in said wall adapted to produce cumulative non-symmetrical force to non-uniformly collapse said deformable liner upon detonation of said explosive mass, to form a jet train of amorphous metal masses from said liner and to accelerate said jet train along a path angularly displaced from said center axis against a target tank defensive armor system.

2. The warhead of claim 1, wherein;

said radial asymmetry consists of non-uniform radial thickness variations in said mass of explosive surrounding said liner.

3. The warhead of claim 1, wherein;

said radial asymmetry consists of non-uniform density variation in said mass of explosive surrounding said liner.

4. The warhead of claim 1, wherein;

said radial asymmetry consists of a non-uniform density variation in said liner across a plane transverse said projectile center axis.

5. The warhead of claim 1, wherein;

said liner is an arcuate shaped liner.

6. The warhead of claim 1, wherein;

said liner is hemispherical.

7. The warhead of claim 1, wherein;

said conical liner has a hollow frustum provided with a jet-tip inhibitor.

8. In an improved anti-tank warhead for an elongated cylindrical non-rotating projectile symmetrical about a center axis having:

a shaped-charge comprising a generally conical hollow deformable thin-walled metallic liner symmetrical with said center axis, a generally cylindrical mass of explosive co-axially surrounding said liner in symmetry with said center axis, a rigid elongated generally cylindrical wall co-axially surrounding said explosive mass symmetrical with said center axis of said projectile, the improvement consisting of:

radial asymmetries in said wall adapted to produce a controlled cumulative non-symmetrical force to controllably collapse said deformable liner upon detonation of said explosive mass, to form a jet train of amorphous metal masses from said liner and to accelerate said jet train along a controlled predicted path angularly displace from said center axis against a target tank defensive armor system.

9. The structure of claim 8, wherein:

said radial asymmetry consists of said wall whose thickness is varied across a plane transverse said projectile center axis that causes an imbalance of force to controllably divert said jet along a predicted path off said axis of symmetry.

10. In an improved anti-tank warhead for an elongated cylindrical non-rotating projectile symmetrical about a center axis having:

a shaped-charge comprising a generally conical hollow deformable thin-walled metallic liner symmetrical with said center axis of said projectile, a generally cylindrical mass of explosive co-axially surrounding said liner in symmetry with said center axis, and a rigid elongated generally cylindrical wall co-axially surrounding said explosive mass symmetrical with said center axis of said projectile the improvement consisting of:

the point of detonation of said explosive in an axis outside the longitudinal axis of said explosive which is adapted to produce a controlled cumulative non-symmetrical force to controllably collapse said deformable liner upon detonation of said explosive mass to form a jet train of amorphous metal masses from said liner and to accelerate said jet train along a controlled predicted path angularly displaced from said center axis against a target tank defensive armor system.

* * * * *